US012023948B2

(12) United States Patent
Herlambang et al.

(10) Patent No.: US 12,023,948 B2
(45) Date of Patent: Jul. 2, 2024

(54) RECORDING MEDIUM AND INKJET RECORDING METHOD

(71) Applicant: CANON KABUSHIKI KAISHA, Tokyo (JP)

(72) Inventors: Olivia Herlambang, Kanagawa (JP); Yoshiyuki Nagase, Kanagawa (JP); Tetsufumi Shiba, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/352,512

(22) Filed: Jun. 21, 2021

(65) Prior Publication Data

US 2021/0394545 A1 Dec. 23, 2021

(30) Foreign Application Priority Data

Jun. 22, 2020 (JP) ................................ 2020-106691
Jun. 22, 2020 (JP) ................................ 2020-106692
Jun. 16, 2021 (JP) ................................ 2021-100465

(51) Int. Cl.
*B41M 5/52* (2006.01)
*B41M 5/50* (2006.01)

(52) U.S. Cl.
CPC .......... *B41M 5/5218* (2013.01); *B41M 5/506* (2013.01); *B41M 5/5272* (2013.01)

(58) Field of Classification Search
CPC .............. B41M 5/502506; B41M 5/52; B41M 5/5218; B41M 5/5254; B41M 5/5272; B41M 5/5281
See application file for complete search history.

(56) References Cited

U.S. PATENT DOCUMENTS 7,909,446 B2 3/2011 Tsuru et al.
7,935,397 B2 5/2011 Okuda et al.
7,955,669 B2 6/2011 Nagase et al.
(Continued)

FOREIGN PATENT DOCUMENTS

CN 101035872 A 9/2007
CN 109071986 A 12/2018
(Continued)

OTHER PUBLICATIONS

European Search Report issued in corresponding European Application No. 21180283.0 dated Nov. 17, 2021.
(Continued)

*Primary Examiner* — Christopher M Polley
*Assistant Examiner* — Sathavaram I Reddy
(74) *Attorney, Agent, or Firm* — Venable LLP

(57) ABSTRACT

The recording medium according to the present invention includes a substrate, an ink receiving layer (1), and an ink receiving layer (2) arranged on the outermost surface. The ink receiving layer (2) has a thickness of 10 nm or more and 4000 nm or less. The ink receiving layer (1) contains a first inorganic particle and a first binder, and the ink receiving layer (2) contains a second inorganic particle and a second binder. The first binder and the second binder are each a water-insoluble resin. The contact angle θ1 formed between water and a surface of the ink receiving layer (1) is 90° or more, and the contact angle θ2 formed between water and the surface of the ink receiving layer (2) is 60° or more and 85° or less.

19 Claims, 1 Drawing Sheet

(56) References Cited

U.S. PATENT DOCUMENTS

| | | | | |
|---|---|---|---|---|
| 8,142,842 | B2 | 3/2012 | Sugita et al. | |
| 8,252,392 | B2 | 8/2012 | Oguri et al. | |
| 8,486,499 | B2 | 7/2013 | Nito et al. | |
| 8,524,336 | B2 | 9/2013 | Oguri et al. | |
| 8,609,209 | B2 | 12/2013 | Taguri et al. | |
| 8,795,798 | B2 | 8/2014 | Oguri et al. | |
| 8,846,166 | B2 | 9/2014 | Herlambang et al. | |
| 9,944,107 | B2 | 4/2018 | Tanaka et al. | |
| 10,093,119 | B2 | 10/2018 | Nagase et al. | |
| 10,150,318 | B2 | 12/2018 | Ota et al. | |
| 10,166,803 | B2 | 1/2019 | Herlambang et al. | |
| 10,639,905 | B2 | 5/2020 | Shimono et al. | |
| 10,703,123 | B2 | 7/2020 | Herlambang et al. | |
| 2001/0016249 | A1* | 8/2001 | Kitamura | B41M 5/5218 428/32.34 |
| 2002/0048658 | A1 | 4/2002 | Takahashi et al. | |
| 2004/0170778 | A1 | 9/2004 | Tomita et al. | |
| 2008/0095948 | A1 | 4/2008 | Sugita et al. | |
| 2008/0160230 | A1* | 7/2008 | Kobayashi | B41M 5/52 428/32.25 |
| 2008/0241436 | A1* | 10/2008 | Kobayashi | B41M 5/502 428/32.22 |
| 2009/0324857 | A1 | 12/2009 | Okuda et al. | |
| 2017/0282630 | A1 | 10/2017 | Nagase et al. | |
| 2017/0291442 | A1* | 10/2017 | Hatta | B41J 2/4155 |
| 2018/0281383 | A1 | 10/2018 | Herlambang et al. | |
| 2020/0290390 | A1 | 9/2020 | Herlambang et al. | |

FOREIGN PATENT DOCUMENTS

| | | | |
|---|---|---|---|
| EP | 3225415 | A2 | 10/2017 |
| JP | 2000234290 | A | 8/2000 |
| JP | 2002-002090 | A | 1/2002 |
| JP | 2006-051741 | A | 2/2006 |
| JP | 2006-110787 | A | 4/2006 |
| JP | 2007216509 | A | 8/2007 |
| JP | 2008-105235 | A | 5/2008 |
| JP | 2008265152 | A | 11/2008 |
| JP | 2017213731 | A | 12/2017 |
| JP | 2018027635 | A | 2/2018 |
| JP | 2018-165053 | A | 10/2018 |

OTHER PUBLICATIONS

Chinese Office Action issued in corresponding Chinese Application No. 202110690756.3 dated Feb. 7, 2023.

Chinese Office Action issued in corresponding Chinese Application No. 202110690756.3 dated Oct. 20, 2023.

“Printing Material and Printability” by Xuesong Jiang, published in Northeast Forestry University Press, 2nd Edition, Aug. 2016, pp. 195-197.

Chinese Office Action issued in corresponding Chinese Application No. 202110690756.3 dated Mar. 1, 2024.

* cited by examiner

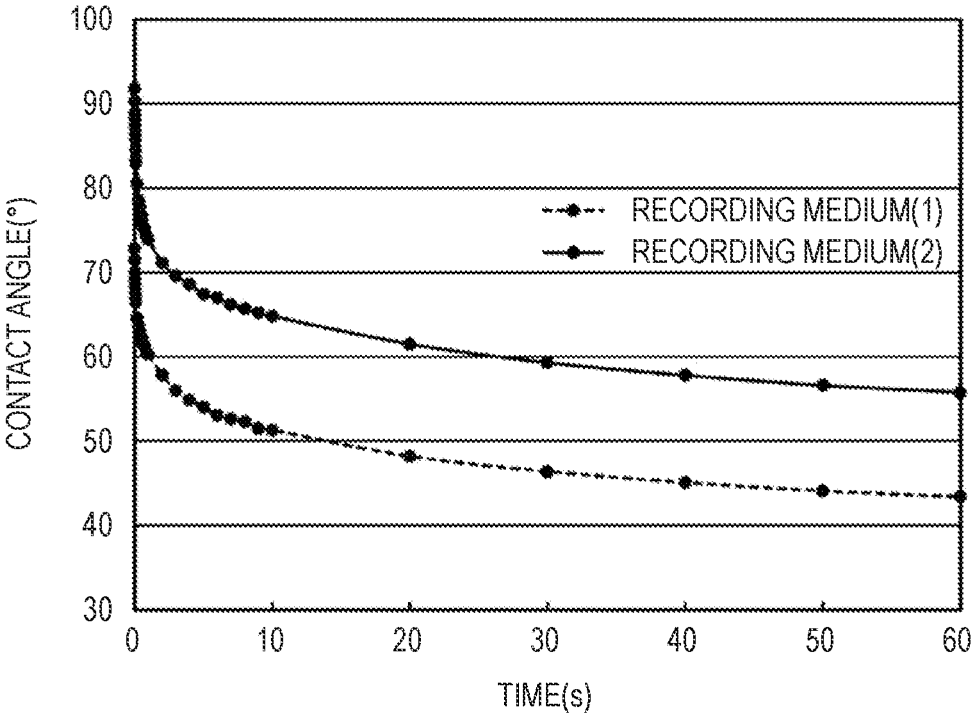
100
90
80
70
60
50
40
30
CONTACT ANGLE(°)
0
10
20
30
40
50
60
TIME(s)
RECORDING MEDIUM(1)
RECORDING MEDIUM(2)

RECORDING MEDIUM AND INKJET RECORDING METHOD

BACKGROUND OF THE INVENTION

Field of the Invention

The present invention relates to a recording medium and an inkjet recording method.

Description of the Related Art

Recently, recording media which enable recording of images having high image quality and high color developability are required with an increase in image recording speed using recording apparatuses such as inkjet recording apparatuses. Moreover, recorded products obtained by recording images on recording media are more often displayed outdoor. When displayed outdoor, those recorded products may be processed by lamination in order to avoid influences on the images from rain and wind in some cases. Unfortunately, such lamination performed on the recorded products may result in complicated steps and increased costs in some cases. For this reason, there has been a demand for a non-laminated recording medium which is less affected by rain and wind and has improved moisture resistance.

For example, some patent documents (Japanese Patent Application Laid-Open Nos. 2008-105235, 2006-110787, 2006-051741, and 2018-165053) each disclose a recording medium including a layer containing a water-insoluble resin, such as an acrylic resin or a urethane resin, as a recording medium for obtaining a recorded product for outdoor displays, the recording medium having improved moisture resistance. Another patent document (Japanese Patent Application Laid-Open No. 2002-002090) discloses a recording sheet including an ink receiving layer having improved ink absorption, and an ink permeating layer which contains a surfactant having an HLB value of 9 or less and is disposed on the ink receiving layer.

SUMMARY OF THE INVENTION

Accordingly, the present invention is directed to providing a recording medium which has high moisture resistance to allow outdoor display, hardly causes beading even if an aqueous ink is used, and enables recording of high-quality images. The present invention is also directed to providing a recording medium including an ink receiving layer having excellent ink absorption and high durability to enable outdoor display. The present invention is also directed to providing an inkjet recording method which enables recording of high-quality images.

One aspect according to the present invention provides a recording medium including a substrate; an ink receiving layer (1) disposed on the substrate; and an ink receiving layer (2) disposed on the ink receiving layer (1) and arranged on the outermost surface, wherein the ink receiving layer (2) has a thickness of 10 nm or more and 4000 nm or less, the ink receiving layer (1) contains a first inorganic particle and a first binder, the ink receiving layer (2) contains a second inorganic particle and a second binder, the first binder and the second binder are each a water-insoluble resin, a contact angle $\theta$1 formed between water and a surface of the ink receiving layer (1) one second after contacting of the water and the surface of the ink receiving layer (1) is 90° or more, and a contact angle $\theta$2 formed between water and a surface of the ink receiving layer (2) one second after contacting of the water and the surface of the ink receiving layer (2) is 60° or more and 85° or less.

Another aspect according to the present invention provides a recording medium including a substrate; an ink receiving layer (1) disposed on the substrate; and an ink receiving layer (2) disposed on the ink receiving layer (1) and arranged on the outermost surface, wherein the ink receiving layer (2) has a thickness of 10 nm or more and 4000 nm or less, the ink receiving layer (1) contains a first inorganic particle and a first binder, the ink receiving layer (2) contains a second inorganic particle and a second binder, the first binder and the second binder are each a water-insoluble resin, a contact angle $\theta A$ formed between water and a surface of the ink receiving layer (2) 60 seconds after contacting of the water and the surface of the ink receiving layer (2) is 40° or more and 80° or less, and the contact angle $\theta A$ and a contact angle $\theta A'$ satisfy the relationship represented by the following expression (I):

$$\theta A' - \theta A \geq 5° \quad (I)$$

where the contact angle $\theta A'$ represents an angle formed between water and the surface of the ink receiving layer (2) 60 seconds after contacting of the water and the surface of the ink receiving layer (2) included in the recording medium immersed in water for 60 minutes and then sufficiently dried.

Still another aspect according to the present invention provides an inkjet recording method of ejecting an ink from a recording head of an inkjet system to record an image on a recording medium, wherein the ink is an aqueous ink containing a pigment, and the recording medium is the recording medium described above.

Further features of the present invention will become apparent from the following description of exemplary embodiments with reference to the attached drawing.

BRIEF DESCRIPTION OF THE DRAWINGS

FIGURE is a graph illustrating a change over time in the contact angle formed between water and the surface of the ink receiving layer.

DESCRIPTION OF THE EMBODIMENTS

Preferred embodiments of the present invention will now be described in detail in accordance with the accompanying drawings.

By disposing a layer containing a water-insoluble resin on the outermost layer, the recording media disclosed in Japanese Patent Application Laid-Open Nos. 2008-105235 and 2006-110787 have moisture resistance improved to some extent but not a level as high as recently required. In contrast, the recording media disclosed in Japanese Patent Application Laid-Open Nos. 2006-051741 and 2018-165053 include ink receiving layers having improved moisture resistance. However, it is revealed that an aqueous ink applied onto the ink receiving layers included in these recording media readily causes so-called beading, and the quality of the image to be recorded may be impaired depending on the amount of the ink to be applied in some cases.

For this reason, the present inventors have conducted extensive research to provide a recording medium which has high moisture resistance to enable outdoor display and hardly causes beading even if an aqueous ink is applied, and have completed the present invention.

If a polyester resin is used as a binder, which is a constitutional material for an ink receiving layer for a recording sheet disclosed in Japanese Patent Application Laid-Open No. 2002-002090, the ink receiving layer is likely to have insufficient durability because the polyester resin readily hydrolyzes.

For this reason, the present inventors have conducted extensive research to provide a recording medium including an ink receiving layer having excellent ink absorption and high durability to enable outdoor display, and have completed the present invention.

The recording medium according to one embodiment of the present invention will now be described.

<Recording Medium>

The present invention will now be described in more detail by way of preferred embodiments. Hereinafter, the inkjet recording medium will also be simply referred to as "recording medium".

First Embodiment

A first embodiment will be described.

To provide moisture resistance which enables outdoor display, use of a water-insoluble resin rather than a standard water-soluble resin used as a binder for the ink receiving layer is effective. A water-insoluble resin contained as a binder can increase the contact angle of the ink receiving layer to water, providing high moisture resistance to repel rain water and the like.

If a recorded product is displayed outdoor, to suppress dissolution of a color material in the image in rain water, the image is preferably recorded using an aqueous ink containing a pigment having high moisture resistance as a color material (hereinafter, also simply referred to as "pigment ink"). To enhance the color developability of the image to be recorded with the pigment ink, the pigment in the ink applied onto the recording medium should be fixed onto the surface of the recording medium as much as possible. Especially, the ink receiving layer containing the water-insoluble resin as a binder tends to have a larger haze. Thus, fixation of the pigment onto the surface of the recording medium (ink receiving layer) is particularly important to enhance the color developability of the image.

To fix the pigment onto the surface of the ink receiving layer, the type of inorganic particle and that of the water-insoluble resin or the like should be adjusted. However, some combinations of the inorganic particle and the water-insoluble resin may result in increased hydrophobicity of the surface of the ink receiving layer and substantial absence of secondary pores, which promote absorption of the ink, in the ink receiving layer. For this reason, the ink immediately after applied to the ink receiving layer is difficult to wettably spread, and thus readily causes beading.

The present inventors have conducted extensive research to obtain a recording medium maintaining high moisture resistance while enabling suppression in beading. As a result, the present inventors have found the following configuration, and have completed the present invention. That is, the recording medium according to the present invention includes an ink receiving layer (2) arranged on the outermost surface, and an ink receiving layer (1) which is disposed under the ink receiving layer (2) and contains a specific inorganic particle (first inorganic particle) and a water-insoluble resin (first binder). The contact angle θ1 formed between water and a surface of the ink receiving layer (1) one second after contacting of the water and the surface of the ink receiving layer (1) is controlled to be 90° or more. High moisture resistance can be demonstrated by controlling the contact angle θ1 formed between water and the surface of the ink receiving layer (1) to be 90° or more.

Furthermore, the ink receiving layer (2) arranged on the outermost surface contains a second inorganic particle and a water-insoluble resin (second binder), and the ink receiving layer (2) has a thickness of 10 nm or more and 4000 nm or less. The contact angle θ2 formed between water and the surface of the ink receiving layer (2) one second after contacting of the water and the surface of the ink receiving layer (2) is controlled to be 60° or more and 85° or less. Such a configuration can efficiently suppress beading. By arranging the ink receiving layer (2) having a contact angle θ2 to water of 60° or more and 85° or less on the outermost surface, the moisture resistance can be maintained and wettable spreading of the ink on the surface of the ink receiving layer (2) can be improved. Because enhanced wettability of the ink on the surface of the ink receiving layer (2) reduces the amount of the ink absorbed per unit area, the liquid component in the ink which stagnates on the surface of the ink receiving layer (2) can be reduced, and thus beading can be suppressed. An ink receiving layer (2) having a thickness of less than 10 nm cannot have a contact angle θ2 of 85° or less due to the influences from the ink receiving layer (1) arranged under the ink receiving layer (2), thus leading to difficulties in suppressing beading. In contrast, an ink receiving layer (2) having a thickness of more than 4000 nm occupies a larger proportion in the entire ink receiving layer, where the ink receiving layer (2) has moisture resistance lower than that of the ink receiving layer (1), therefore reducing the moisture resistance of the recording medium.

The configuration of the recording medium according to one aspect of the present invention will now be described in detail.

(Substrate)

Examples of the substrate include those made of only base paper, those made of only a plastic film, and those made of only a cloth. In addition, a substrate having a laminate structure including a plurality of layers can also be used. Specifically, examples of the substrate include those including base paper and resin layers, that is, resin-coated substrates. Among these, substrates preferably used are resin-coated substrates, plastic films, or clothes from the viewpoint of applications to outdoor displays.

The substrate has a thickness (film thickness) of preferably 50 μm or more and 400 μm or less, more preferably 70 μm or more and 200 μm or less. The thickness of the substrate can be measured and calculated according to the following method. First, a cross-section of the recording medium cut out with a microtome is observed with a scanning electron microscope. The thickness of the substrate is measured at any 100 or more points, and the average is defined as the thickness of the substrate. The thickness of the layer (film) other than the substrate is also measured and calculated by the same method as above.

(1) Resin-Coated Substrate

[Base Paper]

The base paper is produced by papermaking using wood pulp as the main raw material and synthetic pulp such as polypropylene and/or synthetic fibers such as nylon and polyester fibers as needed. Examples of the wood pulp include hardwood bleached kraft pulp (LBKP), hardwood bleached sulfite pulp (LBSP), softwood bleached kraft pulp (NBKP), softwood bleached sulfite pulp (NBSP), hardwood dissolving pulp (LDP), softwood dissolving pulp (NDP), hardwood unbleached kraft pulp (LUKP), and softwood unbleached kraft pulp (NUKP). These wood pulps can be used alone or in combination. Among these wood pulps, preferred is use of LBKP, NBSP, LBSP, NDP, and LDP containing a large amount of short fiber components. Preferred pulps are chemical pulps containing a small amount of impurities (such as sulfate pulp and sulfite pulp). The pulp having whiteness improved by bleaching is also preferred. The base paper may contain a sizing agent, a white pigment, a paper strengthening agent, a fluorescent brightener, a moisture retainer, a dispersant, and a soft feel agent as needed.

The base paper has a thickness of preferably 50 μm or more and 130 μm or less, more preferably 90 μm or more and 120 μm or less. The paper density of the base paper specified in JIS P 8118:2014 is preferably 0.6 $g/cm^3$ or more and 1.2 $g/cm^3$ or less, more preferably 0.7 $g/cm^3$ or more and 1.2 $g/cm^3$ or less.

[Resin Layer]

If the base paper is coated with a resin, the resin layer may be disposed to cover part of the surface of the base paper. The coverage of the resin layer (the area of the surface of the base paper coated with the resin layer/the total area of the surface of the base paper) is preferably 70% or more, more preferably 90% or more, particularly preferably 100% or the entire surface of the base paper coated with the resin layer.

The resin layer has a thickness of preferably 20 μm or more and 60 μm or less, more preferably 35 μm or more and 50 μm or less. If the resin layer is disposed on both surfaces of the base paper, it is preferred that the thickness of each surface of the resin layer satisfy the range specified above.

The resin used in the resin layer is preferably a thermoplastic resin. Examples of the thermoplastic resin include acrylic resin, acrylic silicone resins, polyolefin resins, and styrene-butadiene copolymers. Among these, polyolefin resins are preferred. The polyolefin resin indicates a polymer prepared using an olefin as a monomer. Specific examples of the polyolefin resin include homopolymers and copolymers of ethylene, propylene, and isobutylene. These polyolefin resins can be used alone or in combination. Among these, polyethylene is preferably used. The polyethylene to be used is preferably low density polyethylene (LDPE) or high density polyethylene (HDPE).

To adjust the opacity, the whiteness, and the hue, the resin layer may contain a white pigment, a fluorescent brightener, and ultramarine. Among these, the white pigment is preferably contained because it can enhance the opacity. Examples of the white pigment include rutile or anatase titanium oxide. The content of the white pigment in the resin layer is preferably 3 $g/m^2$ or more and 30 $g/m^2$ or less. If the resin layer is disposed on both surfaces of the base paper, it is preferred that the total content of the white pigment contained in both surfaces of the resin layer satisfy the range specified above. The content of the white pigment in the resin layer is preferably 25% by mass or less relative to the content of the resin. If the content is more than 25% by mass, the dispersion stability of the white pigment may be insufficient in some cases.

The arithmetic average roughness Ra of the resin layer specified in JIS B 0601:2001 is preferably 0.12 μm or more and 0.18 μm or less, more preferably 0.13 μm or more and 0.15 μm or less. The average length RSm of roughness profile elements of the resin layer specified in JIS B 0601:2001 is preferably 0.01 mm or more and 0.20 mm or less, more preferably 0.04 mm or more and 0.15 mm or less.

(2) Plastic Film

The term "plastic" in this specification indicates those containing 50% by mass or more of a polymer having a molecular weight of 10,000 or more as a component, and the term "plastic film" indicates a plastic processed into a film. The plastic used in the plastic film is a thermoplastic plastic. Specifically, examples thereof include vinyl-based plastics, polyester-based plastics, cellulose ester-based plastics, polyamide-based plastics, and heat-resistant engineering plastics.

Examples of the vinyl-based plastics include polyethylene, polyvinyl chloride, poly(vinylidene chloride), poly(vinyl alcohol)), polystyrene, polypropylene, and fluorinated resins. Examples of the polyester-based plastics include polycarbonate and poly(ethylene terephthalate). Examples of the cellulose ester-based plastics include cellulose diacetate, cellulose triacetate, and cellulose acetate butyrate. Examples of the polyamide-based plastics include nylon 6, nylon 66, and nylon 12. Examples of the heat-resistant engineering plastics include polyimide, polysulfone, polyethersulfone, polyphenylene sulfide, polyether ether ketone, and polyether imide. These plastics may be used alone or in combination. From the viewpoint of durability and cost, polyvinyl chloride, polypropylene, polycarbonate, and poly(ethylene terephthalate) are preferably used.

A synthetic paper made of a plastic subjected to treatments such as chemical treatment, surface coating, and internal addition to enhance the opacity can also be used as the plastic film. Examples of the chemical treatment include a method of immersing a surface of a plastic film in an organic solvent such as acetone or methyl isobutyl ketone to form a swelling layer, and drying and solidifying the swelling layer with another organic solvent such as methanol. Examples of the surface coating include a method of forming a layer made of a white pigment such as calcium carbonate or titanium oxide and a binder on the surface of the plastic. Examples of the internal addition include a method of mixing, as a filler, a pigment such as calcium carbonate, titanium oxide, zinc oxide, white carbon, clay, talc, or barium sulfate into the plastic. Furthermore, a foamed plastic film can also be used, which has an opacity enhanced by adding a poly(butylene terephthalate) fine particle, a polycarbonate fine particle, a polyester resin, or a polycarbonate resin to form gaps inside the plastic.

The plastic film has a thickness of preferably 50 μm or more and 300 μm or less, more preferably 75 μm or more and 135 μm or less. The glass transition temperature of the plastic forming the plastic film is preferably −20° C. or more and 150° C. or less, more preferably −20° C. or more and 80° C. or less. The glass transition temperature can be measured by differential scanning calorimetry (DSC), for example.

The density (plastic density) of the plastic film specified in JIS K 7112:1999 is preferably 0.6 $g/cm^3$ or more and 1.5 $g/cm^3$ or less, more preferably 0.7 $g/cm^3$ or more and 1.4 $g/cm^3$ or less. The moisture absorbing rate of the plastic film specified in JIS K 7209:2000 is preferably 5% by mass or less, more preferably 1% by mass or less.

The adhesion between the ink receiving layer and the plastic film can be enhanced by subjecting the plastic film to a surface treatment by a surface oxidation treatment. Examples of the surface oxidation treatment include corona discharge treatment, frame treatment, plasma treatment, glow discharge treatment, and ozone treatment. These treatments can be performed alone or in combination. Among these, ozone treatment is preferred. The amount for treatment is preferably 10 to 200 $(W \cdot min)/m^2$, more preferably 50 to 150 $(W \cdot min)/m^2$.

(3) Cloth

The term "cloth" in this specification indicates a large number of fibers processed into a thin, wide platy shape. Examples of the fibers include natural fibers, fibers of materials having the properties of natural fibers, regenerated fibers regenerated from plastics, and synthetic fibers made of polymers such as petroleum as a raw material. Examples of the natural fibers include cotton, silk, hemp, mohair, wool, and cashmere fibers. Examples of the regenerated fibers includes acetate, cupra, rayon and regenerated polyester fibers. Examples of the synthetic fibers include nylon, polyester, acrylic, vinylon, polyethylene, polypropylene, polyamide, and polyurethane fibers.

(Ink Receiving Layer)

The ink receiving layer (1) is disposed on the substrate. Furthermore, the ink receiving layer (2) is disposed on the ink receiving layer (1) to be arranged on the outermost surface. In other words, the ink receiving layer includes two or more layers including the ink receiving layer (1) and the ink receiving layer (2). The contact angle θ1 formed between water and the surface of the ink receiving layer (1) one second after contacting of the water and the surface of the ink receiving layer (1) is 90° or more. Although the upper limit of the contact angle θ1 formed between water and the surface of the ink receiving layer (1) is not particularly limited as long as it falls within the range such that the ink receiving layer (1) can absorb the ink, the contact angle θ1 formed between water and the surface of the ink receiving layer (1) is preferably 120° or less. The contact angle θ2 formed between water and the surface of the ink receiving layer (2) one second after contacting of the water and the surface of the ink receiving layer (2) is 60° or more and 85° or less. Hereinafter, the term "ink receiving layer", when simply referred, indicates both of the "ink receiving layer (1)" and the "ink receiving layer (2)". The ink receiving layer may be disposed on only one surface of the substrate, or may be disposed on both surfaces thereof

[Ink Receiving Layer (1)]

The ink receiving layer (1) contains a first inorganic particle and a first binder. The first binder is a water-insoluble resin.

The thickness of the ink receiving layer (1) is appropriately set according to the needed ink volume to be absorbed. The thickness of the ink receiving layer (1) is preferably 25 μm or more because the ink absorption can be more favorably maintained. In contrast, the thickness of the ink receiving layer (1) is preferably 50 μm or less because defects such as crack hardly occur.

The contact angle θ1 can be measured before the ink receiving layer (2) is disposed. Even after the ink receiving layer (2) is disposed, the contact angle θ1 can also be measured by scraping the ink receiving layer (2) using an ultraprecision polishing film or the like to expose the ink receiving layer (1) therefrom.

[Ink Receiving Layer (2)]

The ink receiving layer (2) contains a second inorganic particle and a second binder. The second binder is a water-insoluble resin. In other words, the first binder and the second binder are each a water-insoluble resin. The first binder and the second binder may be the same or different.

The ink receiving layer (2) has a thickness of 10 nm or more and 4000 nm or less. An ink receiving layer (2) having a thickness of less than 10 nm causes difficulties in controlling the contact angle θ2 to be 85° or less, resulting in an insufficient effect of suppressing beading. In contrast, an ink receiving layer (2) having a thickness of more than 4000 nm has reduced moisture resistance. The ink receiving layer (2) preferably has a thickness of 10 nm or more and 500 nm or less.

For example, the mass ratio of the content of the second binder to that of the second inorganic particle in the ink receiving layer (2) is controlled to be smaller than the mass ratio of the content of the first binder to that of the first inorganic particle in the ink receiving layer (1). Such a configuration can provide a contact angle θ2 smaller than the contact angle θ1. The effect of enhancing the moisture resistance and the effect of suppressing beading can be further improved by designing the contact angles θ1 and θ2 to satisfy the relationship represented by the following expression (1):

$$\theta 1 - \theta 2 \geq 10° \quad (1)$$

The ink receiving layer (2) preferably has a surface roughness Ra of 30 nm or more and 150 nm or less. By controlling the surface roughness Ra of the ink receiving layer (2) within this range, peel-off from the image recorded with a pigment ink can be suppressed, and the color developability can be enhanced, thus providing a recorded product having higher fastness and color developability. The surface roughness Ra of the ink receiving layer (2) can be measured by observing the surface of the ink receiving layer (2) using a scanning probe microscope.

[Inorganic Particle]

Examples of the first inorganic particle and the second inorganic particle (hereinafter, also simply referred to as "inorganic particle") include particle of alumina hydrate, alumina, silica, colloidal silica, titanium dioxide, zeolite, kaolin, talc, hydrotalcite, zinc oxide, zinc hydroxide, aluminum silicate, calcium silicate, magnesium silicate, calcium carbonate, zirconium oxide, and zirconium hydroxide. The first inorganic particle and the second inorganic particle may be the same or different.

The first inorganic particle is preferably at least one selected from the group consisting of alumina hydrate, gas phase alumina, and gas phase silica particle. Use of these inorganic particle as the first inorganic particle facilitates fixation of the pigment in the ink onto the surface of the ink receiving layer, thus enhancing the color developability of the image.

The second inorganic particle is preferably colloidal silica. Use of the colloidal silica as the second inorganic particle can enhance the gloss of the recording medium. The average particle diameter of the water-insoluble resin used as the second binder is preferably 200 nm or less because the gloss of the recording medium is enhanced. Although the colloidal silica hardly forms pores which promote absorption of the ink, a reduction in ink absorption by the ink receiving layer (2) can be suppressed even in use of colloidal silica as the second inorganic particle because the thickness of the ink receiving layer (2) is 4000 nm or less.

(1) Alumina Hydrate

A preferred alumina hydrate is represented by General Formula (X):

$$Al_2O_{3-n}(OH)_{2n} \cdot mH_2O \quad (X)$$

where n represents 0, 1, 2, or 3; and m represents the number from 0 to 10, preferably 0 to 5; m and n are not 0 at the same time. In many cases, $mH_2O$ indicates water which is not involved in formation of crystal lattices and can be eliminated. Thus, m is an integer or a number other than an integer. By heating, m may be turned to 0 in some cases.

The alumina hydrate can be prepared by a known method. Specifically, examples thereof include a method of hydrolyzing aluminum alkoxide; a method of hydrolyzing aluminate sodium; a method of adding an aqueous solution of aluminum sulfate or aluminum chloride to an aqueous solution of aluminate sodium to perform neutralization.

The crystal structure of the alumina hydrate includes amorphous, gibbsite, and boehmite structures according to the temperature for heat treatment. The alumina hydrate having any one of the crystal structures can be used. Among these, preferred are an alumina hydrate having a boehmite structure and an amorphous alumina hydrate. The crystal structure of the alumina hydrate can be analyzed by X-ray diffraction.

Preferably, alumina hydrate particles (alumina particles) as an aqueous dispersion are mixed with a coating solution for an ink receiving layer. An acid is preferably used as a dispersant for the alumina particles. Examples of the acid to be used include sulfonic acid, lactic acid, glycolic acid, and acetic acid.

The alumina particles have an average primary particle diameter of preferably 20 nm or more and 100 nm or less, more preferably 20 nm or more and 80 nm or less. The average primary particle diameter of the inorganic particles can be determined by observation with a transmission electron microscope (TEM) or a scanning electron microscope (SEM), for example.

The alumina particles have an average secondary particle diameter of preferably 155 nm or more and 560 nm or less, more preferably 160 nm or more and 560 nm or less. The average secondary particle diameter is particularly preferably 170 nm or more and 540 nm or less, and most particularly 190 nm or more and 250 nm or less. The average secondary particle diameter of the inorganic particles indicates the volume average particle diameter (hereinafter, also simply referred to as "average particle diameter") measured and calculated by the light scattering method. Examples of an apparatus for determining the average secondary particle diameter of the inorganic particles by the light scattering method include a dynamic light scattering measurement apparatus (trade name "ELS-Z", available from Otsuka Electronics Co., Ltd.).

A recording medium (ink receiving layer (2)) having a surface roughness Ra of 30 nm or more and 150 nm or less can be readily obtained by use of the alumina particles having the average primary particle diameter and the average secondary particle diameter within the ranges above.

(2) Gas Phase Alumina

Examples of the gas phase alumina include γ-alumina, α-alumina, δ-alumina, θ-alumina, and χ-alumina. Among these, γ-alumina is preferably used from the viewpoint of the optical density of the image and the ink absorption. Examples of commercial products of the gas phase alumina include trade names AEROXIDE, Alu C, Alu130, and Alu65 (available from EVONIK AG).

The specific surface area of the gas phase alumina determined by the BET method is preferably 50 $m^2/g$ or more and 150 $m^2/g$, more preferably 80 $m^2/g$ or more and 120 $m^2/g$ or less. The average primary particle diameter of the gas phase alumina is preferably 5 nm or more and 30 nm or less, more preferably 11 nm or more and 15 nm or less.

Preferably, the gas phase alumina as an aqueous dispersion is mixed with a coating solution for an ink receiving layer. An acid is preferably used as a dispersant for the gas phase alumina Examples of the acid to be used include sulfonic acid, lactic acid, glycolic acid, and acetic acid. The average secondary particle diameter of the dispersed gas phase alumina is preferably 50 nm or more and 300 nm or less. The average secondary particle diameter of the dispersed gas phase alumina can be measured by dynamic light scattering.

(3) Gel Process Silica

The silica is mainly classified into wet process silica and dry process (gas phase) silica. The wet process includes a process of appropriately polymerizing active silica generated by decomposition of a silicic acid salt with an acid, and aggregating and sedimenting the product to yield hydrous silica.

The gel process silica can be produced, for example, by the method described below. First, a silica hydrosol generated by reacting a silicic acid salt with an inorganic acid to have an $SiO_2$ concentration of 10 to 20% by mass is gelated to prepare a silica hydrogel. Examples of the silicic acid salt to be used include sodium silicate, potassium silicate, and ammonium silicate. Sodium silicate is often used in industrial applications. Examples of the inorganic acid include sulfuric acid, nitric acid, and hydrochloric acid. Usually, sulfuric acid is used. In the next step, the resulting silica hydrogel is washed with water to remove inorganic acid salts included in the silica hydrogel.

The average pore diameter and the oil absorption value can be adjusted by controlling the conditions for the hydrothermal treatment of the silica hydrogel from which inorganic acid salts are removed. For example, a hydrothermal treatment of the silica hydrogel with water having a pH of 2 to 10 at 20 to 100° C. increases the average pore diameter and the oil absorption value. In other words, the average pore diameter and the oil absorption value of the silica gel can be adjusted by appropriately setting the pH and the temperature of water to be used in the hydrothermal treatment and the treatment time. A hydrothermal treatment with water having a pH of 2 to 8 at 40 to 90° C. is preferred in consideration of the balance among the physical properties of the silica gel. The silica hydrogel is ground with a ball mill into silica particles having an average secondary particle diameter of several micrometers, and the resulting particles are dried at 100 to 1,000° C. for 1 to 100 seconds. Thus, the gel process silica can be prepared.

(4) Gas Phase Silica

The dry process (gas phase process) includes known processes such as a process by high-temperature gas phase hydrolysis of halogenated silicon (flame hydrolysis) and a process of obtaining anhydrous silica by a method (arc method) by reduction and vaporization of quartz sand and cokes by heating with arc in an electric furnace and then oxidation of the product with air. Among these, the silica (gas phase silica) obtained by the dry process (gas phase process) is preferably used. The gas phase silica is preferred because it has a particularly large specific surface area to enhance the absorption of the ink. The gas phase silica, which has a small refractive index, can impart transparency to the ink receiving layer to enhance the color developability of the image. Examples of commercial products of the gas phase silica include trade names Aerosil (available from Nippon Aerosil Co., Ltd.); and Reolosil QS type (available from Tokuyama Corporation).

The specific surface area of the gas phase silica determined by the BET method is preferably 50 $m^2/g$ or more and 400 $m^2/g$ or less, more preferably 100 $m^2/g$ or more and 350 $m^2/g$ or less.

The gas phase silica is preferably mixed with a coating solution for an ink receiving layer, as an aqueous dispersion. A cationic resin or a polyvalent metal salt is preferably used as a dispersant for the gas phase silica. Examples of the cationic resin include polyethyleneimine resins, polyamine resins, polyamide resins, polyamide epichlorohydrin resins, polyamine epichlorohydrin resins, polyamide polyamine epichlorohydrin resins, polydiallylamine resins, and dicyandiamide condensates. Examples of the polyvalent metal salt include aluminum compounds such as polyaluminum chloride, polyaluminum acetate, and polyaluminum lactate.

The dispersed gas phase silica preferably has an average secondary particle diameter of 50 nm or more and 300 nm or less. The average secondary particle diameter of the dispersed gas phase silica can be measured by dynamic light scattering.

(5) Colloidal Silica

A preferred colloidal silica to be used is spherical colloidal silica. Use of the spherical colloidal silica can further enhance the gloss of the recording medium and can further enhance the transparency, resulting in further enhanced color developability of the image to be recorded. The term "spherical" indicates that the value (value b/a) of the average short diameter b to the average long diameter a of (50 or more and 100 or less) colloidal silica particles observed with a scanning electron microscope is 0.80 or more and 1.00 or less. The value b/a of the colloidal silica is preferably 0.90 or more and 1.00 or less, more preferably 0.95 or more and 1.00 or less.

The colloidal silica is preferably cationized, more preferably a spherical cationic colloidal silica. Examples of commercial products of the spherical cationic colloidal silica include trade names PL-3 and PL-7 (available from Fuso Chemical Co., Ltd.); SNOWTEX AK, SNOWTEX AK-L, and MP-2040 (available from Nissan Chemical Industries, Ltd.); and Cartacoat K303C (available from Clariant AG). To further enhance the ink absorption and the color developability of the image, the colloidal silica preferably has an average primary particle diameter of 10 nm or more and 100 nm or less.

[Binder]

The first binder contained in the ink receiving layer (1) and the second binder contained in the ink receiving layer (2) are each a water-insoluble resin. The term "binder" in this specification indicates a material which binds inorganic particles to form a coating film. The term "water-insoluble resin" in this specification indicates a resin 95% by mass or more of which remains after immersed in hot water at 80° C. for 2 hours.

The water-insoluble resin is preferably at least one selected from the group consisting of an acrylic resin, polycarbonate-modified urethane resins, and polyether-modified urethane resins from the viewpoint of moisture resistance.

[Water-Insoluble Resin]

(1) Acrylic Resin

The term "acrylic resin" in this specification indicates a polymer of a (meth)acrylate ester. The acrylic resin may be a homopolymer if the (meth)acrylate ester is used as a monomer, or may be a copolymer with a different monomer.

Examples of the acrylate ester include methyl acrylate, ethyl acrylate, butyl acrylate, 2-ethylhexyl acrylate, 2-dimethylaminoethyl acrylate, 2-hydroxyethyl acrylate, 2-hydroxypropyl acrylate, 2-hydroxybutyl acrylate, isobutyl acrylate, octyl acrylate, lauryl acrylate, and stearyl acrylate. Examples of the methacrylic acid ester include methyl methacrylate, ethyl methacrylate, butyl methacrylate, 2-ethylhexyl methacrylate, 2-dimethylaminoethyl methacrylate, 2-hydroxyethyl methacrylate, 2-hydroxypropyl methacrylate, 2-hydroxybutyl methacrylate, isobutyl methacrylate, octyl methacrylate, lauryl methacrylate, and stearyl methacrylate.

Examples of the different monomer copolymerizable with the (meth)acrylate ester include vinyl-based monomers. Examples of the vinyl-based monomers include styrenes such as styrene, vinyltoluene, vinylbenzoic acid, α-methylstyrene, p-hydroxymethyl styrene, and styrenesulfonic acid and derivatives thereof; and vinyl ethers such as methyl vinyl ether, butyl vinyl ether, methoxyethyl vinyl ether, N-vinylpyrrolidone, 2-vinyloxazoline, and vinylsulfonic acid and derivatives thereof.

Preferred acrylic resins are polyacrylate esters, polymethacrylate esters, and copolymers of acrylate esters with methacrylate esters. Among these, preferred are copolymers of acrylate esters with methacrylate esters because the glass transition temperature of the resulting acrylic resin can be controlled by designing the copolymerization ratio of the methacrylate ester and the acrylate ester.

(2) Urethane Resin

The term "urethane resin" in this specification indicates a resin having a urethane bond in the structure. Examples of the urethane resin include at least one of a polycarbonate-modified urethane resin and a polyether-modified urethane resin. Hereinafter, the polycarbonate-modified urethane resin and the polyether-modified urethane resin are also collectively referred as "urethane resin" simply.

The urethane resin can be prepared by reacting a polyisocyanate, a polyol, and a chain extender. Examples of the polyisocyanate include aromatic isocyanates such as tolylene diisocyanate, diphenylmethane diisocyanate, polymeric diphenylmethane diisocyanate, tolidine diisocyanate, naphthalene diisocyanate, xylylene diisocyanate, and tetramethylxylylene diisocyanate; and aliphatic isocyanates and alicyclic isocyanates such as hexamethylene diisocyanate, trimethylhexamethylene diisocyanate, and isophorone diisocyanate.

Examples of the polyol include polyether-based polyols such as polypropylene glycol, polyethylene glycol, and polytetramethylene glycol; and polycarbonate-based polyols such as polyhexamethylene carbonates. Examples of the chain extender to be used include compounds having (an) active hydrogen atom(s), such as low-molecular glycols (such as ethylene glycol), low-molecular diamines, and low-molecular aminoalcohols. These components can be used alone or in combination.

The water-insoluble resin preferably has a glass transition temperature (Tg) of 20° C. or less. Use of a water-insoluble resin having a glass transition temperature of 20° C. or less can enhance the binding force between the binder and the inorganic particle to further enhance the moisture resistance of the ink receiving layer. The glass transition temperature of the water-insoluble resin can be measured by differential scanning calorimetry (DSC), for example.

From the viewpoint of the ink absorption, the content of the first binder in the ink receiving layer (1) is preferably 70% by mass or less, more preferably 50% by mass or less relative to the content of the first inorganic pigment. From the viewpoint of the binding properties of the ink receiving layer, the content of the first binder in the ink receiving layer (1) is preferably 25% by mass or more, more preferably 30% by mass or more relative to the content of the first inorganic pigment. From the viewpoint of the moisture resistance, it is preferred that the ink receiving layer (1) contain 14% by mass or less of the first water-soluble resin relative to the content of the first binder in the ink receiving layer (1), or be free of the first water-soluble resin.

From the viewpoint of the ink absorption and the suppression of beading, the content of the second binder in the ink receiving layer (2) is preferably 50% by mass or less, more preferably 40% by mass or less relative to the content of the second inorganic pigment. From the viewpoint of the binding properties of the ink receiving layer, the content of the second binder in the ink receiving layer (2) is preferably 15% by mass or more, more preferably 20% by mass or more relative to the content of the second inorganic pigment. From the viewpoint of the moisture resistance, it is preferred that the ink receiving layer (2) contain 14% by mass or less of the second water-soluble resin relative to the content of the second binder in the ink receiving layer (2), or be free of the second water-soluble resin.

[Water-Soluble Resin]

The ink receiving layer (1) and the ink receiving layer (2) can contain the first water-soluble resin and the second water-soluble resin as binders, respectively. Hereinafter, the "first water-soluble resin" and the "second water-soluble resin" are also collectively referred to as "water-soluble resin".

Examples of the water-soluble resin include poly(vinyl alcohol), polyvinylpyrrolidone, and water-soluble cellulose. From the viewpoint of the moisture resistance, it is preferred that the ink receiving layer (i) be free of the water-soluble resin; or (ii) contain 14% by mass or less of the water-soluble resin as a proportion in the water-insoluble resin. The ratio of the content of the water-soluble resin to the content of the water-insoluble resin in the ink receiving layer can be calculated from the raw materials used to form the ink receiving layer, or can be measured and calculated by the following method.

Initially, 10 g of an ink receiving layer scraped from a recording medium is placed into 1,000 g or more of hot water (80° C. or more), followed by stirring and then filtration. The mass of the solid contents yielded by drying the filtrate is measured (where the mass is defined as X (g)). The value calculated by "10 (g)−X (g)" is defined as the content of the water-soluble resin in 10 g of the ink receiving layer. In the next step, the solid content of X (g) is heated at 600° C. for 2 hours, and the mass of the obtained residues are measured (where the mass is defined as Y (g)). The value calculated as "X (g)−Y (g)" is defined as the content of the water-insoluble resin in 10 g of the ink receiving layer.

The "ratio of the content of the water-soluble resin to the content of the water-insoluble resin" can be calculated by an expression represented by [10 (g)−X (g)]/[X (g)−Y (g)]. Furthermore, the "ratio of the content of the water-insoluble resin to the content of the inorganic particle" can be calculated by an expression represented by [(X (g)−Y (g)]/[Y (g)].

[Other Additives]

The ink receiving layer may contain other additives than these components described above. Examples of other additives include a cross-linking agent, a pH adjuster, a thickener, a fluidity improver, an antifoaming agent, a foam suppressor, a surfactant, a mold release agent, a penetrating agent, a coloring pigment, a coloring dye, a fluorescent brightener, an ultraviolet absorbing agent, an antioxidant, a preservative agent, an antifungal agent, a water repellent agent, ink fixing agent, a curing agent, and materials having high fastness.

Examples of the cross-linking agent include aldehyde-based compounds, melamine-based compounds, isocyanate-based compounds, zirconium-based compounds, titanium-based compounds, amide-based compounds, aluminum-based compounds, boric acid, boric acid salts, carbodiimide-based compounds, and oxazoline-based compounds. Examples of the ink fixing agent include cationic resins other than the acrylic resin and the urethane resin described above, and polyvalent metal salts.

Examples of the cationic resin include polyethyleneimine resins, polyamine resins, polyamide resins, polyamide epichlorohydrin resins, polyamine epichlorohydrin resins, polyamide polyamine epichlorohydrin resins, polydiallyl amine resins, and dicyandiamide condensates. Examples of the polyvalent metal salts include calcium compounds, magnesium compounds, zirconium compounds, titanium compounds, and aluminum compounds. Among these, calcium compounds are preferred, and calcium nitrate tetrahydrate is more preferred.

To enhance the ink absorption and suppress beading, the ink receiving layer preferably contains a surfactant. Examples of the surfactant include acetylene-based surfactants, fluorinated surfactants, silicone-based surfactants, polyether-modified silicone-based surfactants, polysiloxane-based surfactants, and ether-modified polysiloxane-based surfactants. Among these, acetylene-based surfactants are preferred.

(Method of Producing Recording Medium)

The recording medium can be produced by any method. For example, the recording medium can be preferably produced by a production method including a step (coating solution preparing step) of preparing the coating solution for the ink receiving layer (1) and the coating solution for the ink receiving layer (2), and a step (coating step) of applying the prepared coating solutions to the substrate.

In the coating solution preparing step, the coating solution for the ink receiving layer (1) and the coating solution for the ink receiving layer (2) are prepared. These coating solutions can be prepared by mixing the components described above according to a usual method, respectively.

In the coating step, the prepared coating solutions are applied onto the substrate to form coating layers, respectively. The coating solution for the ink receiving layer (1) and the coating solution for the ink receiving layer (2) are sequentially applied, or are simultaneously applied. Among these, sequential application of the coating solution for the ink receiving layer (1) and the coating solution for the ink receiving layer (2) is preferred because the mixing of these coating solutions can be suppressed.

To apply the coating solution onto the substrate, a gate roll coater, a size press, a bar coater, a blade coater, an air knife coater, a roll coater, a brush coater, a curtain coater, a gravure coater, a spray device, or the like can be used. A coating solution appropriately heated may be applied.

Preferably, a coating layer formed by application of the coating solutions onto the substrate is dried. The coating layer can be dried using a hot air dryer such as a straight tunnel dryer, an arch dryer, an air loop dryer, or a sign-curve air float dryer. Infrared radiation, a heating dryer, a dryer using microwaves or the like can also be used. The heating temperature during drying can be controlled to be 80 to 130° C., for example.

Before the coating solution is applied to the substrate, a surface treatment solution containing a surface treatment agent may be applied onto the surface of the substrate (the surface to which the coating solution is applied). By preliminarily applying the surface treatment solution to the surface of the substrate, the wettability of the coating solution to the substrate can be enhanced to enhance the adhesion between the ink receiving layer to be formed and the substrate. Examples of the surface treatment agent include thermoplastic resins such as an acrylic resin, a polyurethane resin, a polyester resin, a polyethylene resin, a polyvinyl chloride resin, a polypropylene resin, a polyamide resin, and styrene-butadiene copolymers; and silane coupling agents. The surface treatment solution may contain inorganic particle of titanium oxide, calcium carbide, silica, or alumina as needed.

Second Embodiment

Next, a second embodiment will be described.

The present inventors have conducted extensive research to provide a recording medium including an ink receiving layer having excellent ink absorption and high durability which enables outdoor display. As a result, the prevent inventors have found that the above object can be achieved by the following configuration, and have completed the present invention. In other words, the recording medium according to the present invention includes an ink receiving layer (2) arranged on the outermost surface, and an ink receiving layer (1) disposed under the ink receiving layer (2), the ink receiving layer (1) containing a specific inorganic particle (first inorganic particle) and a water-insoluble resin (first binder). Such a configuration enables demonstration of high durability in outdoor displays.

Furthermore, the ink receiving layer (2) arranged on the outermost surface contains a second inorganic particle and a water-insoluble resin (second binder), and the thickness of the ink receiving layer (2) is controlled to be 10 nm or more and 4000 nm or less. The contact angle θA formed between water and the surface of the ink receiving layer (2) 60 seconds after contacting of the water and the surface of the ink receiving layer (2) is 40° or more and 80° or less. The contact angle θA and a contact angle θA' satisfy the relationship represented by the following expression (I):

$$\theta A'-\theta A \geq 5° \quad \text{(I)}$$

where the contact angle θA' represents an angle formed between water and the surface of the ink receiving layer (2) 60 seconds after contacting of the water and the surface of the ink receiving layer (2), which is included in a recording medium immersed in water for 60 minutes and then sufficiently dried.

The present inventors infer the reason why such a configuration can improve the ink absorption and the durability to enable outdoor display as below.

The water repellent effect of the ink receiving layer can be significantly improved by controlling the contact angle θA formed between water and the surface of the ink receiving layer 60 seconds after contacting of the water and the surface of the ink receiving layer (2) to be 40° or more. This results in an ink receiving layer (2) having high durability. In addition, beading can be suppressed because the contact angle formed between water and the surface of the ink receiving layer 60 seconds after contacting of the water and the surface of the ink receiving layer (2) is 80° or less. Furthermore, by controlling the contact angle θA' and the contact angle θA to satisfy the relationship represented by the expression (I), the contact angle of the recorded product including a recorded image can be increased after the recorded product is displayed outdoor and exposed to rain water. As a result, water repellency of the surface of the ink receiving layer (2) can be significantly improved to enhance the durability of the ink receiving layer to a level enabling outdoor display.

The same configuration of the recording medium and the same method of producing the recording medium as those according to the first embodiment can be used as the configuration of the recording medium according to the second embodiment and the method of producing the recording medium. Among these, the ink receiving layer (2) of the recording medium according to the second embodiment preferably contains a surfactant having an HLB value of more than 10, and more preferably contains a surfactant having an HLB value of 13 or more. An ink receiving layer (2) which contains a surfactant having an HLB value of more than 10 can adjust the contact angle θA formed between water and the surface of the ink receiving layer (2) to 40° or more and 80° or less, and thus can suppress beading. Furthermore, after the recorded product including a recorded image is displayed outdoor and exposed to rain water, at least part of the surfactant having an HLB value of more than 10 is dissolved in rain water, and is eluted from the ink receiving layer (2). As a result, the contact angles can be adjusted by second binder which is the residual water-insoluble resin left in the ink receiving layer (2) such that the contact angle formed between water and the surface of the ink receiving layer (2) (contact angle θA') is increased by 5° or more than the contact angle before the recorded product is exposed to rain water (contact angle θA). Thus, an ink receiving layer having high durability which enables outdoor display can be provided. The HLB value of the surfactant is determined from the following expression (Griffin's equation):

$$\text{HLB value}=(\text{molecular weight of hydrophilic group}/\text{molecular weight of the whole surfactant})\times 20$$

(Contact Angle Formed Between Water and Surface of Ink Receiving Layer (2))

The contact angles formed between water and the surface of the ink receiving layer (2) (contact angles θA and θA') can be measured using a dynamic contact angle tester (such as a product name "1100DAT" (available from FIBRO GmbH), for example. Specifically, 4 μL of pure water is dropped onto the surface of the ink receiving layer (A), and a video of the state after the dropping is shot. After a needed time has passed, the contact angle formed by the surface of the ink receiving layer (2) and droplets (water) is measured from the video image.

FIGURE is a graph illustrating a change over time in contact angle formed between water and the surface of the ink receiving layer. Specifically, the graph illustrates a change over time in contact angle formed between water and the surface of the ink receiving layer (2) during a period from contacting of the water and the surface of the ink receiving layer (2) to 60 seconds thereafter in a recording medium (1) and a recording medium (2) prepared by immersing the recording medium (1) in water for 60 minutes and then sufficiently drying it. As illustrated in FIGURE, the ink receiving layer (2) of the recording medium (1) has excellent ink absorption because the contact angle θA is 40° or more and 80° or less. The contact angle θA' of the ink receiving layer (2) of the recording medium (2) is larger than the contact angle θA by 5° or more.

The contact angle θA formed between water and the surface of the ink receiving layer (2) 60 seconds after contacting of the water and the surface of the ink receiving layer (2) is 40° or more and 80° or less. It can be determined that the contact angle θA and the contact angle θA' formed between water and the surface of the ink receiving layer (2) 60 seconds after contacting of the water and the surface of the ink receiving layer (2) both become substantially steady. The contact angle θA and the contact angle θA' become steady preferably before 40 seconds passes from contacting with water, more preferably before 20 seconds passes from the contacting, and particularly preferably before 10 seconds passes from the contacting.

<Inkjet Recording Method>

An image can be recorded on the recording medium described above by ejecting the ink from the recording head of an inkjet system and applying the ink onto the recording medium. Examples of the method of ejecting the ink include a method of ejecting the ink by imparting mechanical energy to the ink and that of ejecting the ink by imparting thermal energy to the ink. An aqueous ink containing a pigment as a color material (aqueous pigment ink) is preferably used as the ink.

(Aqueous Pigment Ink)

The aqueous pigment ink usually contains water and a pigment. The aqueous pigment ink can further contain a water-soluble organic solvent and other components as needed. Examples of other components include a viscosity control agent, a pH adjuster, a preservative agent, a surfactant, and an antioxidant.

As water, deionized water or ion-exchanged water is preferably used. The content (% by mass) of water in the ink is preferably 50.0% by mass or more and 95.0% by mass or less in the total mass of the ink. The content (% by mass) of the water-soluble organic solvent in the ink is preferably 3.0% by mass or more and 50.0% by mass or less in the total mass of the ink.

A known pigment can be used as the pigment. The pigment preferably has an average particle diameter of 50 nm or more and 180 nm or less. Because a pigment having an average particle diameter within the above range is more likely to be fixed onto the surface of the recording medium, peel-off of the pigment from the recording medium can be further suppressed.

The present invention can provide a recording medium which has high moisture resistance to enable outdoor display, and enables recording of high-quality images while beading hardly occurs even if an aqueous ink is used. Moreover, the present invention can provide a recording medium including an ink receiving layer having excellent ink absorption and high durability to enable outdoor display. The present invention can also provide an inkjet recording method which enables recording of high-quality images.

EXAMPLES

The present invention will now be described in more detail by way of Examples and Comparative Examples, and Examples below should not be construed as limitations to the present invention unless these Examples depart from the gist of the present invention. The amounts of components represented with "parts" and "%" are mass based unless otherwise specified.

First Example

<Preparation of Substrate>

As a substrate, polypropylene synthetic paper (trade name "NEWYUPO GCR110", available from Yupo Corporation) was prepared.

<Preparation of Inorganic Particle Dispersion>

(Inorganic Particle Dispersions 1A to 1E)

Inorganic particle dispersions each containing inorganic particles and a dispersant were prepared, where the types and the amounts of the inorganic particles and the dispersant were varied as shown in Table 1, respectively. Specifically, while a mixed solution of pure water and the dispersant was being stirred with a mixer, the inorganic particles were placed thereinto. After the inorganic particles were placed, the inorganic particles were further dispersed by stirring with the mixer for 30 minutes to prepare each inorganic particle dispersion. The average particle diameter of the inorganic particles in the prepared inorganic particle dispersion was measured by the following procedure.

Samples for measurement were prepared by diluting the inorganic particle dispersions 1A to 1E with pure water such that the solid content was 1%. In the inorganic particle dispersions 1A to 1D, the average particle diameter (average secondary particle diameter) of the inorganic particles was measured using a dynamic light scattering measurement apparatus (product name "ELS-Z", available from Otsuka Electronics Co., Ltd.). In the inorganic particle dispersion 1E containing wet silica having a large particle diameter, the average particle diameter (average primary particle diameter) of the inorganic particles was measured using a laser diffraction particle diameter distribution measurement apparatus (product name "SALD-2300", available from SHIMADZU Corporation). The details of the components in Table 1 are shown below.

alumina hydrate 1: trade name "HP30", available from Sasol Limited alumina hydrate 2: trade name "HP15", available from Sasol Limited gas phase alumina: trade name "Alumina C", available from EVONIK Industries AG gas phase silica: trade name "Aerosil 200", available from Nippon Aerosil Co., Ltd.

wet silica: trade name "Sylisia 660", available from Fuji Silysia Chemical Ltd.

TABLE 1

| | Inorganic particle | | | Dispersant | |
|---|---|---|---|---|---|
| Inorganic particle dispersion | Type | Content (%) in dispersion | Average particle diameter (nm) | Type | Content (%) relative to inorganic particle |
| 1A | Alumina hydrate 1 | 37 | 180 | Glycolic acid | 1 |
| 1B | Gas phase alumina | 23 | 160 | Acetic acid | 2 |
| 1C | Gas phase silica | 23 | 160 | Polydiallyldimethylamine* | 4 |
| 1D | Alumina hydrate 2 | 23 | 120 | Methanesulfonic acid | 1.5 |
| 1E | Wet silica | 23 | 5000 | — | — |

*: trade name "Sharol DC-902P", available from Dai-ichi Kogyo Seiyaku Co., Ltd.

<Preparation of Coating Solution for Ink Receiving Layer (1)>

(Coating Solutions 1-1 to 1-11)

The components were mixed while the types and the amounts were varied as shown in Table 2, and 2.5 parts of a benzotriazole-type ultraviolet absorbing agent was added relative to 100 parts of inorganic particles. Furthermore, pure water was added to adjust the solid content. Thus, coating solutions 1-1 to 1-11 were prepared. The details of the components in Table 2 are shown below.

acrylic resin: trade name "Movinyl 6950", available from Nihon Gosei Kako Co., Ltd.

polycarbonate-modified urethane resin: trade name "WLS210", available from DIC Corporation polyether-modified urethane resin: trade name "WLS201", available from DIC Corporation polyester-modified urethane resin: trade name "NS310X", available from Takamatsu Oil & Fat Co., Ltd.

poly(vinyl alcohol): trade name "PVA235", available from Kuraray Co., Ltd.

TABLE 2

| Coating solution | Solid content (%) | First Inorganic particle: Inorganic particle dispersion | Amount (parts) | Inorganic particle dispersion | Amount (parts) | Water-insoluble resin (first binder): Type | Content (parts) relative to 100 parts of inorganic particle | First water-soluble resin: Type | Content (parts) relative to 100 parts of inorganic particle |
|---|---|---|---|---|---|---|---|---|---|
| 1-1 | 30 | lA | 100 | | | Acrylic resin | 35 | | |
| 1-2 | 30 | lA | 96 | lE | 4 | Acrylic resin | 35 | | |
| 1-3 | 23 | 1B | 100 | | | Acrylic resin | 35 | | |
| 1-4 | 23 | 1C | 100 | | | Acrylic resin | 35 | | |
| 1-5 | 30 | lA | 100 | | | Acrylic resin | 33 | | |
| 1-6 | 30 | lA | 100 | | | Acrylic resin | 30 | Poly(vinyl alcohol) | 5 |
| 1-7 | 30 | lA | 100 | | | Acrylic resin | 34 | Poly(vinyl alcohol) | 1 |
| 1-8 | 25 | lA | 100 | | | Polycarbonate-modified urethane resin | 35 | | |
| 1-9 | 25 | lA | 100 | | | Polyether-modified urethane resin | 35 | | |
| 1-10 | 25 | lA | 100 | | | Polyester-modified urethane resin | 35 | | |
| 1-11 | 20 | 1D | 100 | | | | | Poly(vinyl alcohol) | 10 |

<Preparation of Coating Solution for Ink Receiving Layer (2)>

(Coating Solutions 2-1 to 2-8)

The components were mixed while the types and the amounts thereof were varied as shown in Table 3. Pure water was then added to adjust the solid content. Thus, coating solutions 2-1 to 2-8 were prepared. The details of the components in Table 3 are shown below.

cationic colloidal silica 1: trade name "SNOWTEX AK", available from Nissan Chemical Industries, Ltd.

cationic colloidal silica 2: trade name "SNOWTEX AKYL", available from Nissan Chemical Industries, Ltd.

acrylic resin: trade name "Movinyl 6940", available from Nihon Gosei Kako Co., Ltd.

acrylic urethane core-shell type emulsion: trade name "ACRIT WEM041U", available from Taisei Fine Chemical Co., Ltd.

poly(vinyl alcohol): trade name "PVA235", available from Kuraray Co., Ltd.

TABLE 3

| Coating solution | Solid content (%) | Second Inorganic particle: Inorganic particle dispersion | Amount (parts) | Water-insoluble resin (second binder): Type | Contents (parts) relative to 100 parts of inorganic particle | Second water-soluble resin: Type | Content (parts) relative to 100 parts of inorganic particle |
|---|---|---|---|---|---|---|---|
| 2-1 | 0.4 | Cationic colloidal silica 1 | 100 | Acrylic resin | 25 | | |
| 2-2 | 0.4 | Cationic colloidal silica 1 | 100 | Acrylic resin | 35 | | |
| 2-3 | 0.4 | Cationic colloidal silica 1 | 100 | Acrylic resin | 40 | | |
| 2-4 | 0.4 | Cationic colloidal silica 1 | 100 | Acrylic resin | 22 | Poly(vinyl alcohol) | 1.5 |
| 2-5 | 0.4 | Cationic colloidal silica 1 | 100 | Acrylic resin | 22 | Poly(vinyl alcohol) | 3.5 |
| 2-6 | 0.4 | Cationic colloidal silica 1 | 100 | Acrylic resin | 32 | | |
| 2-7 | 0.4 | Cationic colloidal silica 1 | 100 | Acrylic resin | 15 | | |

TABLE 3-continued

| | | Second Inorganic particle | | Water-insoluble resin (second binder) | | Second water-soluble resin | |
|---|---|---|---|---|---|---|---|
| Coating solution | Solid content (%) | Inorganic particle dispersion | Amount (parts) | Type | Contents (parts) relative to 100 parts of inorganic particle | Type | Content (parts) relative to 100 parts of inorganic particle |
| 2-8 | 0.4 | | | Acrylic urethane core-shell type emulsion | 15 | | |

<Production of Recording Medium>

The coating solutions for the ink receiving layer (1) as shown in Table 4 were applied onto substrates with a bar coater such that each coating had a dry thickness as shown in Table 4, followed by drying with hot air at 80° C. to form ink receiving layers (1). Using a dynamic contact angle tester (product name "1100DAT", available from FIBRO GmbH), the contact angle θ1 formed between water and the surface of each of the resulting ink receiving layers (1) was measured.

The coating solutions for the ink receiving layer (2) as shown in Table 4 were applied onto the corresponding resulting ink receiving layers (1) with a bar coater such that each coating had a dry thickness as shown in Table 4. Ink receiving layers (2) were formed by drying with hot air at 80° C. to produce recording media. Using a dynamic contact angle tester (product name "1100DAT", available from FIBRO GmbH), the contact angle θ2 formed between water and the surface of each of the resulting ink receiving layers (2) was measured. Cross-sections of the recording media cut out with a microtome were observed with a scanning electron microscope (product name "SU-70", available from Hitachi, Ltd.). The thickness was measured at any 100 or more positions of each cross-section, and the average was calculated and defined as the thickness of the ink receiving layer (1) and that of the ink receiving layer (2).

<Evaluations>

In the criteria for evaluation in each content shown below, "A" and "B" indicate preferred levels, and "C" indicates a nonacceptable level. The results of evaluation are shown in Table 4.

(Moisture Resistance)

Water at 80° C. was run through the surface of the recording medium (ink receiving layer) for 24 hours, followed by drying overnight. A test was performed as follows: a sheet of black paper (trade name "NEWCOLOR®", available from LINTEC Corporation) was pressed against the surface of the ink receiving layer under a load of 75 g/cm$^2$, and the load was reciprocally moved 20 times using a Gakushin friction fastness tester. The Gakushin friction fastness tester used was a trade name "AB-301 COLOR FASTNESS RUBBING TESTER" (available from TESTER SANGYO CO., LTD.). The change rate of the optical density of the surface of the black paper (the surface thereof pressed against the surface of the ink receiving layer) was measured before and after the test using an optical reflection densitometer (trade name "500 spectrodensitometer", available from X-Rite, Incorporated), and the moisture resistance of the recording medium was evaluated according to the criteria for evaluation shown below. A higher change rate of the optical density indicates that a larger amount of the scraped ink receiving layer adheres to the black paper, and thus indicates a lower moisture resistance of the recording medium.

A: A change rate of optical density of less than 20%.

B: A change rate of optical density of 20% or more and less than 30%.

C: A change rate of optical density of 30% or more.

(Beading)

Using an inkjet recording apparatus (trade name "imagePROGRAF Pro4000", available from Canon Inc.) containing an aqueous pigment ink, a patch of (R, G, B)=(0, 255, 0) was recorded on a recording medium in a standard mode for a sheet of water-resistant poster synthetic paper. The patch was recorded under a condition at a temperature of 23° C. and a humidity of 50%. The recorded patch was visually observed to evaluate beading according to the following criteria for evaluation:

A: Beading is not found.

B: Beading is slightly found.

C: Beading is significantly found.

TABLE 4

| | Ink receiving layer (1) | | | Ink receiving layer (2) | | | | Results of evaluation | |
|---|---|---|---|---|---|---|---|---|---|
| | Coating solution | Thickness (μm) | θ1(°) | Coating solution | Thickness (nm) | θ2(°) | θ1-θ2(°) | Moisture resistance | Beading |
| Example 1 | 1-1 | 30 | 95 | 2-1 | 300 | 70 | 25 | A | A |
| Example 2 | 1-2 | 30 | 93 | 2-1 | 300 | 68 | 25 | A | A |
| Example 3 | 1-3 | 30 | 95 | 2-1 | 300 | 70 | 25 | A | A |
| Example 4 | 1-4 | 30 | 95 | 2-1 | 300 | 70 | 25 | A | A |
| Example 5 | 1-5 | 30 | 90 | 2-2 | 300 | 80 | 10 | A | A |
| Example 6 | 1-5 | 30 | 90 | 2-1 | 10 | 85 | 5 | A | B |
| Example 7 | 1-1 | 30 | 95 | 2-4 | 300 | 70 | 25 | B | A |
| Example 8 | 1-7 | 30 | 90 | 2-6 | 300 | 85 | 5 | A | B |
| Example 9 | 1-1 | 30 | 95 | 2-7 | 4000 | 70 | 25 | A | B |
| Example 10 | 1-8 | 30 | 95 | 2-1 | 300 | 70 | 25 | A | A |
| Example 11 | 1-9 | 30 | 95 | 2-1 | 300 | 70 | 25 | A | A |
| Example 12 | 1-10 | 30 | 95 | 2-1 | 300 | 70 | 25 | B | A |

TABLE 4-continued

| | Ink receiving layer (1) | | | Ink receiving layer (2) | | | | Results of evaluation | |
|---|---|---|---|---|---|---|---|---|---|
| | Coating solution | Thickness (μm) | θ1(°) | Coating solution | Thickness (nm) | θ2(°) | θ1-θ2(°) | Moisture resistance | Beading |
| Comparative Example 1 | 1-1 | 30 | 95 | — | — | — | 95 | A | C |
| Comparative Example 2 | 1-1 | 30 | 95 | 2-3 | 300 | 88 | 7 | A | C |
| Comparative Example 3 | 1-1 | 30 | 95 | 2-5 | 300 | 55 | 40 | C | A |
| Comparative Example 4 | 1-6 | 30 | 72 | 2-1 | 100 | 60 | 12 | C | A |
| Comparative Example 5 | 1-11 | 30 | 15 | 2-8 | 100 | 60 | −45 | C | A |

Second Example

<Preparation of Substrate>

As a substrate, polypropylene synthetic paper (trade name "NEWYUPO GCR110", available from Yupo Corporation) was prepared.

<Preparation of Coating Solution for Ink Receiving Layer>

Inorganic particles shown in Tables 5-1 and 5-2 were each placed into a mixed solution of pure water and a dispersant while the mixed solution was being stirred with a mixer. After the inorganic particles were placed into the mixed solutions, the inorganic particles were dispersed by stirring for another 30 minutes with the mixer to yield inorganic particle dispersions (solid content: 37%). The dispersant used was glycolic acid. The amount of the dispersant was 1% of that of the inorganic particles. The resulting inorganic particle dispersions were mixed with the components, whose types and amounts were varied as shown in Tables 5-1 and 5-2. Furthermore, pure water was added to adjust the solid content to prepare coating solutions for ink receiving layer (B) and coating solutions for the ink receiving layer (A). The details of the components in Tables 5-1 and 5-2 are shown below.

alumina: trade name "HP30", available from Sasol Limited acrylic resin 1: trade name "Movinyl 6950", available from The Nippon Synthetic Chemical Industry Co., Ltd.

acrylic resin 2: trade name "Movinyl 6940", available from The Nippon Synthetic Chemical Industry Co., Ltd.

polycarbonate-modified urethane resin: trade name "HYDRAN WLS210", available from DIC Corporation polyether-modified urethane resin: trade name "HYDRAN WLS201", available from DIC Corporation ultraviolet absorbing agent: trade name "Hostavin 3315", available from Clariant AG poly(vinyl alcohol) (product name: PVA235, available from Kuraray Co., Ltd.)

colloidal silica: trade name "ST-AK", available from Nissan Chemical Industries, Ltd.

acetylene glycol 1: trade name "OLFINE E1004", available from Nissin Chemical Industry Co., Ltd., HLB value=9 acetylene glycol 2: trade name "Surfynol 420", available from Nissin Chemical Industry Co., Ltd., HLB value=4 acetylene glycol 3: trade name "Surfynol 465", available from Nissin Chemical Industry Co., Ltd., HLB value=13 acetylene glycol 4: trade name "Surfynol 485", available from Nissin Chemical Industry Co., Ltd., HLB value=17

Because the surfactants (acetylene glycols 1 to 4) used all had a dry solid content of 100% (namely, effective component content: 100%), calculation was performed assuming "mass of surfactant=mass of dry solid content".

<Production of Recording Medium>

The coating solutions for the ink receiving layer (1) were applied onto substrates with a bar coater such that each coating had a dry thickness as shown in Table 5-1, followed by drying with hot air at 80° C. to form ink receiving layers (1). The coating solutions for the ink receiving layer (2) were applied onto the corresponding resulting ink receiving layers (1) with a bar coater such that each coating had a dry thickness as shown in Table 5-2. The ink receiving layers (2) were formed by drying with hot air at 80° C. to produce recording media. Cross-sections of the recording media cut out with a microtome were observed with a scanning electron microscope (product name "SU-70", available from Hitachi, Ltd.). The thickness was measured at any 100 or more positions of each cross-section, and the average was calculated and defined as the thickness of the ink receiving layer (1) and that of the ink receiving layer (2).

TABLE 5-1

| | Ink receiving layer (1) (underlying layer) | | | | | | | | |
|---|---|---|---|---|---|---|---|---|---|
| | | Average secondary particle | | Water-insoluble resin (first binder) | | Ultraviolet absorbing agent | Second water-soluble resin | | |
| | Type | diameter (nm) | Amount (parts) | Type | Amount (parts) | Amount (parts) | Type | Amount (parts) | Thickness (nm) |
| Example 1 | Alumina | 200 | 100 | Acrylic resin 1 | 35 | 2.5 | | | 30 |
| Example 2 | Alumina | 200 | 100 | Acrylic resin 1 | 35 | 2.5 | | | 30 |
| Example 3 | Alumina | 200 | 100 | Acrylic resin 1 | 35 | 2.5 | | | 30 |

TABLE 5-1-continued

| | Ink receiving layer (1) (underlying layer) | | | | | | | | | |
|---|---|---|---|---|---|---|---|---|---|---|
| | | Average secondary particle | | Water-insoluble resin (first binder) | | Ultraviolet absorbing agent | Second water-soluble resin | | |
| | Type | diameter (nm) | Amount (parts) | Type | Amount (parts) | Amount (parts) | Type | Amount (parts) | Thickness (nm) |
| Example 4 | Alumina | 200 | 100 | Acrylic resin 1 | 35 | 2.5 | | | 30 |
| Example 5 | Alumina | 200 | 100 | Acrylic resin 1 | 35 | 2.5 | | | 30 |
| Example 6 | Alumina | 200 | 100 | Acrylic resin 1 | 35 | 2.5 | | | 30 |
| Example 7 | Alumina | 200 | 100 | Acrylic resin 1 | 35 | 2.5 | | | 30 |
| Example 8 | Alumina | 200 | 100 | Acrylic resin 1 | 31 | 2.5 | Poly(vinyl alcohol) | 4 | 30 |
| Example 9 | Alumina | 200 | 100 | Acrylic resin 1 | 30 | 2.5 | Poly(vinyl alcohol) | 5 | 30 |
| Example 10 | Alumina | 200 | 100 | Polycarbonate-modified urethane resin | 35 | 2.5 | | | 30 |
| Example 11 | Alumina | 200 | 100 | Polyether-modified urethane resin | 35 | 2.5 | | | 30 |
| Comparative Example 1 | Alumina | 200 | 100 | Acrylic resin 1 | 35 | 2.5 | | | 30 |
| Comparative Example 2 | Alumina | 200 | 100 | Acrylic resin 1 | 35 | 2.5 | | | 30 |
| Comparative Example 3 | Alumina | 200 | 100 | Acrylic resin 1 | 35 | 2.5 | | | 30 |
| Comparative Example 4 | Alumina | 200 | 100 | Acrylic resin 1 | 35 | 2.5 | | | 30 |
| Comparative Example 5 | Alumina | 200 | 100 | Acrylic resin 1 | 35 | 2.5 | | | 30 |

TABLE 5-2

| | Ink receiving layer (2) (outermost layer) | | | | | | | | | |
|---|---|---|---|---|---|---|---|---|---|---|
| | Second inorganic particle | | Water-insoluble resin (second binder) | | Second water-soluble resin | | Surfactant | | | |
| | Type | Amount (parts) | Type | Amount (parts) | Type | Amount (parts) | Type | HLB value | Amount (parts) | Thickness (nm) |
| Example 1 | Colloidal silica | 100 | Acrylic resin 2 | 25 | | | Acetylene glycol 4 | 17 | 333 | 300 |
| Example 2 | Colloidal silica | 100 | Acrylic resin 2 | 25 | | | Acetylene glycol 3 | 13 | 333 | 300 |
| Example 3 | Colloidal silica | 100 | Acrylic resin 2 | 25 | | | Acetylene glycol 3 | 13 | 333 | 10 |
| Example 4 | Colloidal silica | 100 | Acrylic resin 2 | 25 | | | Acetylene glycol 3 | 13 | 333 | 4000 |
| Example 5 | Colloidal silica | 100 | Acrylic resin 2 | 25 | | | Acetylene glycol 3 | 13 | 500 | 300 |
| Example 6 | Colloidal silica | 100 | Acrylic resin 2 | 22 | Poly (vinyl alcohol | 1.5 | Acetylene glycol 3 | 13 | 333 | 300 |
| Example 7 | Colloidal silica | 100 | Acrylic resin 2 | 22 | Poly (vinyl alcohol | 3.5 | Acetylene glycol 3 | 13 | 333 | 300 |
| Example 8 | Colloidal silica | 100 | Acrylic resin 2 | 25 | | | Acetylene glycol 3 | 13 | 333 | 300 |
| Example 9 | Colloidal silica | 100 | Acrylic resin 2 | 25 | | | Acetylene glycol 3 | 13 | 333 | 300 |
| Example 10 | Colloidal silica | 100 | Acrylic resin 2 | 25 | | | Acetylene glycol 3 | 13 | 333 | 300 |
| Example 11 | Colloidal silica | 100 | Acrylic resin 2 | 25 | | | Acetylene glycol 3 | 13 | 333 | 300 |
| Comparative Example 1 | | | | | | | | | | |
| Comparative Example 2 | Colloidal silica | 100 | Acrylic resin 2 | 25 | | | Acetylene glycol 1 | 9 | 333 | 300 |
| Comparative Example 3 | Colloidal silica | 100 | Acrylic resin 2 | 25 | | | Acetylene glycol 2 | 4 | 333 | 300 |
| Comparative Example 4 | Colloidal silica | 100 | Acrylic resin 2 | 25 | | | Acetylene glycol 3 | 13 | 30 | 300 |
| Comparative Example 5 | Colloidal silica | 100 | Acrylic resin 2 | 25 | | | Acetylene glycol 3 | 13 | 700 | 300 |

<Evaluations>

In the criteria for evaluation in each content shown below, "A", "B", and "B−" indicate preferred levels, and "C" indicates a nonacceptable level. The results of evaluation are shown in Table 6.

(Measurement of Contact Angle)

The contact angle θA formed between water and the surface of the ink receiving layer (2) 60 seconds after contacting of the water and the surface of the ink receiving layer (2) was measured using a dynamic contact angle tester (product name "1100DAT", available from FIBRO GmbH). Furthermore, the contact angle θA' formed between water and the surface of the ink receiving layer (2) 60 seconds after contacting of the water and the surface of the ink receiving layer (2) included in a recording medium immersed in water for 60 minutes and then sufficiently dried was measured. The measured contact angle θA and contact angle θA' are shown in Table 6. Furthermore, the calculated value of (θA'−θA) is shown in Table 6.

(Durability)

A durability test was performed according to ISO18930 by a method for an outdoor weathering acceleration test of exposing the recording medium for 600 hours. The film strength of the ink receiving layer after the durability test was measured to evaluate the durability of the ink receiving layer. Specifically, a sheet of black paper (trade name "NEWCOLOR®", available from LINTEC Corporation) was pressed against the surface of the ink receiving layer of the recording medium after the durability test under a load of 75 g/cm$^2$, and the load was reciprocally moved 20 times using a Gakushin friction fastness tester. The Gakushin friction fastness tester used was a trade name "AB-301 COLOR FASTNESS RUBBING TESTER" (available from TESTER SANGYO CO., LTD.). Subsequently, using an optical reflection densitometer (trade name "500 spectro-densitometer", available from X-Rite, Incorporated), the optical density ($OD_1$) of the black paper not contacting the surface of the ink receiving layer and the optical density ($OD_2$) of the black paper contacting the surface of the ink receiving layer were measured. The film strength of the ink receiving layer was calculated from the following expression:

$$\text{film strength (\%)}=(OD_1/OD_2)\times 100$$

From the calculated film strength, the durability of the ink receiving layer was evaluated according to the criteria for evaluation shown below. All the ink receiving layers of the recording media before the durability test had durability evaluated as "A".

A: film strength of 80% or more.

B: film strength of 65% or more and less than 80%.

B−: film strength of 55% or more and less than 65%.

C: film strength of less than 55%.

(Ink Absorption)

A solid pattern was recorded with a cyan ink on the recording media with an ink jet recording apparatus imagePROGRAF Pro 4000 (manufactured by Canon) charged with an aqueous pigment in a recording mode of water-resistant poster synthetic paper standard. Then, the recorded solid pattern was visually observed for examining the degree of ink drying after recording and excessive spread of the ink in the recorded pattern. The results were rated according to the criteria below. The recording was performed at a temperature of 23° C. and a humidity of 50%. The average particle diameter of the pigment used as the coloring material in the ink was in the range of 50 nm to 180 nm. Table 6 shows the examination results.

A: The ink was dried very well immediately after recording, and excessive spread of ink was not observed at all.

B: The degree of ink drying after recording decreased to some extent, but excessive spread was hardly observed.

C: The degree of ink drying after recording decreased, and excessive spread was also observed.

TABLE 6

| | Contact angle (°) | | | Results of evaluation | |
|---|---|---|---|---|---|
| | θA | θA' | θA'-θA | Outdoor durability | Ink absorption |
| Example 1 | 74 | 86 | 12 | A | A |
| Example 2 | 72 | 81 | 9 | A | A |
| Example 3 | 80 | 85 | 5 | A | B |
| Example 4 | 65 | 83 | 18 | A | B |
| Example 5 | 55 | 63 | 8 | B | A |
| Example 6 | 65 | 75 | 10 | B | A |
| Example 7 | 42 | 65 | 23 | B− | A |
| Example 8 | 55 | 67 | 12 | B | A |
| Example 9 | 51 | 65 | 14 | B− | A |
| Example 10 | 68 | 75 | 7 | A | A |
| Example 11 | 67 | 74 | 7 | A | A |
| Comparative Example 1 | 85 | 86 | 1 | A | C |
| Comparative Example 2 | 66 | 68 | 2 | C | A |
| Comparative Example 3 | 42 | 43 | 1 | C | A |
| Comparative Example 4 | 83 | 85 | 2 | A | C |
| Comparative Example 5 | 37 | 50 | 13 | C | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-106691, filed Jun. 22, 2020, Japanese Patent Application No. 2020-106692, filed Jun. 22, 2020, and Japanese Patent Application No. 2021-100465, filed Jun. 16, 2021, which are hereby incorporated by reference herein in their entirety.

What is claimed is:

1. A recording medium comprising a substrate, a first ink receiving layer disposed on the substrate, and a second ink receiving layer disposed on the first ink receiving layer and arranged on an outermost surface of the recording medium, wherein the second ink receiving layer has a thickness of 10 nm or more and 400 nm or less, wherein the first ink receiving layer contains a first inorganic particle and a first binder, wherein the first inorganic particle is at least one selected from the group consisting of alumina hydrate, gas phase alumina, and gas phase silica, wherein the first binder is at least one selected from the group consisting of acrylic resin, polycarbonate-modified urethane resin, polyether-modified urethane resin, and polyester-modified urethane resin, wherein the second ink receiving layer contains a second inorganic particle and a second binder, wherein the second inorganic particle is cationic colloidal silica, wherein the second binder is acrylic resin, wherein the first binder and the second binder are each a water-insoluble resin, wherein a contact angle θ1 formed between water and a surface of the first ink receiving layer, one second after contacting of the water and the surface of the first ink receiving layer, is 90° or more, and wherein a contact angle θ2 formed between water and a surface of the second ink receiving layer, one second after contacting of the water and the surface of the second ink receiving layer, is 68° or more and 85° or less.

2. The recording medium according to claim 1, wherein the contact angle θ1 and the contact angle θ2 satisfy the relationship represented by the following expression (1):

$$\theta 1-\theta 2 \geq 10° \quad (1)$$

3. The recording medium according to claim 1, wherein the first ink receiving layer contains 14% by mass or less of a first water-soluble resin relative to the content of the first binder in the first ink receiving layer, or is free of the first water-soluble resin.

4. The recording medium according to claim 1, wherein the second ink receiving layer contains 14% by mass or less of a second water-soluble resin relative to the content of the second binder in the second ink receiving layer, or is free of the second water-soluble resin.

5. The recording medium according to claim 1, wherein the mass ratio of the content of the second binder to the content of the second inorganic particle in the second ink receiving layer is lower than the mass ratio of the content of the first binder to the content of the first inorganic particle in the first ink receiving layer.

6. The recording medium according to claim 1, wherein the recording medium is an inkjet recording medium.

7. The recording medium according to claim 1, wherein the second ink receiving layer contains a surfactant having a HLB value of more than 10.

8. The recording medium according to claim 1, wherein the second ink receiving layer has a thickness of 10 nm or more and 300 nm or less.

9. The recording medium according to claim 1, wherein the first inorganic particle is an alumina particle having an average primary particle diameter of 20 nm or more and 100 nm or less.

10. An inkjet recording method of ejecting an ink from a recording head of an inkjet system to record an image on a recording medium, wherein the ink is an aqueous ink containing a pigment, wherein the recording medium comprises a substrate, a first ink receiving layer disposed on the substrate, and a second ink receiving layer disposed on the first ink receiving layer and arranged on an outermost surface of the recording medium, wherein the second ink receiving layer has a thickness of 10 nm or more and 400 nm or less, wherein the first ink receiving layer contains a first inorganic particle and a first binder, wherein the first inorganic particle is at least one selected from the group consisting of alumina hydrate, gas phase alumina, and gas phase silica, wherein the first binder is at least one selected from the group consisting of acrylic resin, polycarbonate-modified urethane resin, polyether-modified urethane resin, and polyester-modified urethane resin, wherein the second ink receiving layer contains a second inorganic particle and a second binder, wherein the second inorganic particle is cationic colloidal silica, wherein the second binder is acrylic resin, wherein the first binder and the second binder are each a water-insoluble resin, wherein a contact angle θ1 formed between water and a surface of the first ink receiving layer, one second after contacting of the water and the surface of the first ink receiving layer, is 90° or more, and wherein a contact angle θ2 formed between water and a surface of the second ink receiving layer, one second after contacting of the water and the surface of the second ink receiving layer, is 68° or more and 85° or less.

11. The inkjet recording method according to claim 10, wherein the second ink receiving layer has a thickness of 10 nm or more and 300 nm or less.

12. The inkjet recording method according to claim 10, wherein the first inorganic particle is an alumina particle having an average primary particle diameter of 20 nm or more and 100 nm or less.

13. A recording medium comprising a substrate, a first ink receiving layer disposed on the substrate, and a second ink receiving layer disposed on the first ink receiving layer and arranged on an outermost surface of the recording medium, wherein the second ink receiving layer has a thickness of 10 nm or more and 400 nm or less, wherein the first ink receiving layer contains a first inorganic particle and a first binder, wherein the first inorganic particle is alumina, wherein the first binder is at least one selected from the group consisting of acrylic resin, polycarbonate-modified urethane resin, and polyether-modified urethane resin, wherein the second ink receiving layer contains a second inorganic particle, and a second binder and a surfactant, wherein the second inorganic particle is colloidal silica, wherein the second binder is acrylic resin, wherein the surfactant is an acetylene glycol having a HLB value from 13 to 17, wherein the first binder and the second binder are each a water-insoluble resin, wherein a contact angle θA formed between water and a surface of the second ink receiving layer, 60 seconds after contacting of the water and the surface of the second ink receiving layer, is 40° or more and 80° or less, and wherein the contact angle θA and a contact angle θA' satisfy the relationship represented by the following expression (I):

$$\theta A'-\theta A \geq 5° \quad (I)$$

where the contact angle θA' represents an angle formed between water and a surface of the second ink receiving layer, 60 seconds after contacting of the water and the surface of the second ink receiving layer included in the recording medium immersed in water for 60 minutes and then sufficiently dried.

14. The recording medium according to claim 13, wherein the first ink receiving layer contains 14% by mass or less of a first water-soluble resin relative to the content of the first binder in the first ink receiving layer, or is free of the first water-soluble resin.

15. The recording medium according to claim 13, wherein the second ink receiving layer contains 14% by mass or less of a second water-soluble resin relative to the content of the second binder in the second ink receiving layer, or is free of the second water-soluble resin.

16. The recording medium according to claim 13, wherein the mass ratio of the content of the second binder to the content of the second inorganic particle in the second ink receiving layer is lower than the mass ratio of the content of the first binder to the content of the first inorganic particle in the first ink receiving layer.

17. The recording medium according to claim 13, wherein the recording medium is an inkjet recording medium.

18. The recording medium according to claim 13, wherein the second ink receiving layer has a thickness of 10 nm or more and 300 nm or less.

19. The recording medium according to claim 13, wherein the first inorganic particle is an alumina particle having an average primary particle diameter of 20 nm or more and 100 nm or less.

* * * * *